(12) United States Patent
Gupta et al.

(10) Patent No.: US 7,635,745 B2
(45) Date of Patent: *Dec. 22, 2009

(54) SULFOPOLYESTER RECOVERY

(75) Inventors: Rakesh Kumar Gupta, Kingsport, TN (US); Allen Lynn Crain, Kingsport, TN (US); Daniel William Klosiewicz, Kingsport, TN (US); Scott Ellery George, Kingsport, TN (US); Kab Sik Seo, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 207 days.

This patent is subject to a terminal disclaimer.

(21) Appl. No.: 11/343,955

(22) Filed: Jan. 31, 2006

(65) Prior Publication Data

US 2007/0179275 A1    Aug. 2, 2007

(51) Int. Cl.
*C08G 63/68* (2006.01)
*C08G 75/00* (2006.01)

(52) U.S. Cl. .................... 528/293; 264/176.1; 264/219; 427/392; 427/395; 428/364; 528/295; 528/480

(58) Field of Classification Search ............ 264/176.1, 264/219; 427/392, 395; 428/364; 528/293, 528/295, 480
See application file for complete search history.

(56) References Cited

U.S. PATENT DOCUMENTS

| | | | |
|---|---|---|---|
| 3,018,272 A | 1/1962 | Griffing et al. |
| 3,033,822 A | 5/1962 | Kibler et al. |
| 3,075,952 A | 1/1963 | Coover et al. |
| 3,528,947 A | 9/1970 | Lappin et al. |
| 3,592,796 A | 7/1971 | Trapasso et al. |
| 3,779,993 A | 12/1973 | Kibler et al. |
| 3,833,457 A | 9/1974 | Misumi et al. |
| 3,846,507 A | 11/1974 | Thomm et al. |
| 4,008,344 A | 2/1977 | Okamoto et al. |
| 4,073,777 A | 2/1978 | O'Neill et al. |
| 4,073,988 A | 2/1978 | Nishida et al. |
| 4,100,324 A | 7/1978 | Anderson et al. |
| 4,104,262 A | 8/1978 | Schade |
| 4,127,696 A | 11/1978 | Okamoto |
| 4,137,393 A | 1/1979 | Sidebotham et al. |
| 4,145,469 A | 3/1979 | Newkirk et al. |
| 4,233,355 A | 11/1980 | Sato et al. |
| 4,234,652 A | 11/1980 | Vanoni et al. |
| 4,239,720 A | 12/1980 | Gerlach et al. |
| 4,297,412 A | 10/1981 | Achard et al. |
| 4,302,495 A | 11/1981 | Marra |
| 4,304,901 A | 12/1981 | O'Neill et al. |
| 4,342,801 A | 8/1982 | Gerlach et al. |
| 4,350,006 A | 9/1982 | Okamoto et al. |
| 4,365,041 A | 12/1982 | Okamoto et al. |
| 4,381,335 A | 4/1983 | Okamoto |
| 4,460,649 A | 7/1984 | Park et al. |
| 4,496,619 A | 1/1985 | Okamoto |
| 4,517,715 A | 5/1985 | Yoshida et al. |
| 4,618,524 A | 10/1986 | Groitzsch et al. |
| 4,699,845 A | 10/1987 | Oikawa et al. |
| 4,738,785 A | 4/1988 | Langston et al. |
| 4,755,421 A | 7/1988 | Manning et al. |
| 4,795,668 A | 1/1989 | Krueger et al. |
| 4,804,719 A | 2/1989 | Weaver et al. |
| 4,810,775 A | 3/1989 | Bendix et al. |
| 4,863,785 A | 9/1989 | Berman et al. |
| 4,910,292 A | 3/1990 | Blount |
| 4,921,899 A | 5/1990 | Phan et al. |
| 4,940,744 A | 7/1990 | Tortorici et al. |
| 4,946,932 A | 8/1990 | Jenkins |
| 4,966,808 A | 10/1990 | Kawano |
| 4,973,656 A | 11/1990 | Blount |
| 4,990,593 A | 2/1991 | Blount |
| 4,996,252 A | 2/1991 | Phan et al. |
| 5,006,598 A | 4/1991 | Adams et al. |
| 5,039,339 A | 8/1991 | Phan et al. |
| 5,057,368 A | 10/1991 | Largman et al. |
| 5,069,970 A | 12/1991 | Largman et al. |
| 5,073,436 A | 12/1991 | Antonacci et al. |
| 5,108,820 A | 4/1992 | Kaneko et al. |
| 5,124,194 A | 6/1992 | Kawano |
| 5,162,074 A | 11/1992 | Hills |

(Continued)

FOREIGN PATENT DOCUMENTS

CA    1290517    10/1991

(Continued)

OTHER PUBLICATIONS

PCT International Search Report dated Jul. 26, 2007.

(Continued)

*Primary Examiner*—Terressa M Boykin
(74) *Attorney, Agent, or Firm*—Polly C. Owen; Bernard J. Graves, Jr.

(57) ABSTRACT

Processes for the recovery of a sulfopolyester polymer from an aqueous dispersion and a sulfopolyester concentrate are provided. Particularly, a sulfopolyester concentrate, from which the sulfopolyester may be recovered and reused, are formed by processes such as evaporation and/or nanofiltration. Final recovery of the sulfopolyester may be achieved by further evaporation of water and/or salt precipitation. In addition, the recovered sulfopolyester and articles manufactured from the recovered sulfopolyester are also provided.

48 Claims, No Drawings

U.S. PATENT DOCUMENTS

| | | |
|---|---|---|
| 5,162,399 A | 11/1992 | Sharma et al. |
| 5,171,767 A | 12/1992 | Buckley et al. |
| 5,176,952 A | 1/1993 | Joseph et al. |
| 5,218,042 A | 6/1993 | Kuo et al. |
| 5,242,640 A | 9/1993 | Butler et al. |
| 5,258,220 A | 11/1993 | Joseph |
| 5,262,460 A | 11/1993 | Suzuki et al. |
| 5,274,025 A | 12/1993 | Stockl et al. |
| 5,277,976 A | 1/1994 | Hogle et al. |
| 5,281,306 A | 1/1994 | Kakiuchi et al. |
| 5,286,843 A | 2/1994 | Wood |
| 5,290,626 A | 3/1994 | Nishioi et al. |
| 5,290,631 A | 3/1994 | Fleury et al. |
| 5,290,654 A | 3/1994 | Sacripante et al. |
| 5,292,581 A | 3/1994 | Viazmensky et al. |
| 5,292,855 A | 3/1994 | Krutak et al. |
| 5,308,697 A | 5/1994 | Muramoto et al. |
| 5,336,552 A | 8/1994 | Strack et al. |
| 5,342,863 A | 8/1994 | Buckley et al. |
| 5,366,804 A | 11/1994 | Dugan |
| 5,368,928 A | 11/1994 | Okamura et al. |
| 5,369,210 A | 11/1994 | George et al. |
| 5,369,211 A | 11/1994 | George et al. |
| 5,378,757 A | 1/1995 | Blount, Jr. et al. |
| 5,382,400 A | 1/1995 | Pike et al. |
| 5,386,003 A | 1/1995 | Greene et al. |
| 5,389,068 A | 2/1995 | Keck |
| 5,395,693 A | 3/1995 | Cho et al. |
| 5,405,698 A | 4/1995 | Dugan |
| 5,423,432 A | 6/1995 | Krutak et al. |
| 5,446,079 A | 8/1995 | Buchanan et al. |
| 5,466,410 A | 11/1995 | Hills |
| 5,482,772 A | 1/1996 | Strack et al. |
| 5,486,418 A | 1/1996 | Ohmory et al. |
| 5,509,913 A | 4/1996 | Yeo |
| 5,525,282 A | 6/1996 | Dugan |
| 5,530,059 A | 6/1996 | Blount, Jr. et al. |
| 5,536,811 A | 7/1996 | Wood |
| 5,543,488 A | 8/1996 | Miller et al. |
| 5,552,495 A | 9/1996 | Miller et al. |
| 5,559,171 A | 9/1996 | Buchanan et al. |
| 5,571,620 A | 11/1996 | George et al. |
| 5,575,918 A | 11/1996 | Virnig et al. |
| 5,580,911 A | 12/1996 | Buchanan et al. |
| 5,593,807 A | 1/1997 | Sacripante et al. |
| 5,599,858 A | 2/1997 | Buchanan et al. |
| 5,605,746 A | 2/1997 | Groeger et al. |
| 5,635,071 A | 6/1997 | Al-Samadi |
| 5,637,385 A | 6/1997 | Mizuki et al. |
| 5,646,237 A | 7/1997 | George et al. |
| 5,652,048 A | 7/1997 | Haynes et al. |
| 5,658,704 A | 8/1997 | Patel et al. |
| 5,660,965 A | 8/1997 | Mychajlowskij et al. |
| 5,688,582 A | 11/1997 | Nagaoka et al. |
| 5,709,940 A | 1/1998 | George et al. |
| 5,736,083 A | 4/1998 | Dugan |
| 5,750,605 A | 5/1998 | Blumenthal et al. |
| 5,759,926 A | 6/1998 | Pike et al. |
| 5,763,065 A | 6/1998 | Patnode et al. |
| 5,798,078 A | 8/1998 | Myers |
| 5,853,701 A | 12/1998 | George et al. |
| 5,883,181 A | 3/1999 | Cicchiello et al. |
| 5,888,916 A | 3/1999 | Tadokoro et al. |
| 5,916,678 A | 6/1999 | Jackson et al. |
| 5,916,725 A | 6/1999 | Patel et al. |
| 5,916,935 A | 6/1999 | Wiggins et al. |
| 5,935,880 A | 8/1999 | Wang et al. |
| 5,954,967 A | 9/1999 | Egraz et al. |
| 5,976,694 A | 11/1999 | Tsai et al. |
| 5,993,668 A | 11/1999 | Duan |
| 5,993,834 A | 11/1999 | Shah et al. |
| 6,004,673 A | 12/1999 | Nishijima |
| 6,007,910 A | 12/1999 | Miller et al. |
| 6,020,420 A | 2/2000 | George |
| 6,057,388 A | 5/2000 | Wiggins et al. |
| 6,090,731 A | 7/2000 | Pike et al. |
| 6,110,588 A | 8/2000 | Perez et al. |
| 6,110,636 A | 8/2000 | Foucher et al. |
| 6,114,407 A | 9/2000 | Myers |
| 6,162,340 A | 12/2000 | Zakikhani |
| 6,162,890 A | 12/2000 | George et al. |
| 6,168,719 B1 | 1/2001 | Shimokawa et al. |
| 6,171,685 B1 | 1/2001 | George et al. |
| 6,174,602 B1 | 1/2001 | Matsui et al. |
| 6,177,193 B1 | 1/2001 | Tsai et al. |
| 6,183,648 B1 | 2/2001 | Kozak et al. |
| 6,211,309 B1 | 4/2001 | McIntosh et al. |
| 6,248,809 B1 | 6/2001 | Buckley et al. |
| 6,300,306 B1 | 10/2001 | Firkins et al. |
| 6,316,592 B1 | 11/2001 | Bates et al. |
| 6,322,887 B1 | 11/2001 | Matsui et al. |
| 6,348,679 B1 | 2/2002 | Ryan et al. |
| 6,365,697 B1 | 4/2002 | Kim et al. |
| 6,369,136 B2 | 4/2002 | Sorriero et al. |
| 6,403,677 B1 | 6/2002 | Walker |
| 6,417,251 B1 | 7/2002 | Brady |
| 6,420,024 B1 | 7/2002 | Perez et al. |
| 6,420,027 B2 | 7/2002 | Kimura et al. |
| 6,428,900 B1 | 8/2002 | Wang |
| 6,440,556 B2 | 8/2002 | Matsui et al. |
| 6,488,731 B2 | 12/2002 | Schultheiss et al. |
| 6,512,024 B1 | 1/2003 | Lundgard et al. |
| 6,533,938 B1 | 3/2003 | Dilorio et al. |
| 6,541,175 B1 | 4/2003 | Jiang et al. |
| 6,548,592 B1 | 4/2003 | Lang et al. |
| 6,550,622 B2 | 4/2003 | Koslow |
| 6,551,353 B1 | 4/2003 | Baker et al. |
| 6,552,123 B1 | 4/2003 | Katayama et al. |
| 6,552,162 B1 | 4/2003 | Wang et al. |
| 6,554,881 B1 | 4/2003 | Healey |
| 6,583,075 B1 | 6/2003 | Dugan |
| 6,586,529 B2 | 7/2003 | Mumick et al. |
| H002086 H | 10/2003 | Amsler |
| 6,638,677 B2 | 10/2003 | Patel et al. |
| 6,692,825 B2 | 2/2004 | Qin et al. |
| 6,730,387 B2 | 5/2004 | Rezai et al. |
| 6,746,766 B2 | 6/2004 | Bond et al. |
| 6,759,124 B2 | 7/2004 | Royer et al. |
| 6,764,802 B2 | 7/2004 | Maric et al. |
| 6,780,560 B2 | 8/2004 | Farrugia et al. |
| 6,780,942 B2 | 8/2004 | Leon et al. |
| 6,838,172 B2 | 1/2005 | Yoon et al. |
| 6,838,403 B2 | 1/2005 | Tsai et al. |
| 6,844,062 B2 | 1/2005 | Matsui et al. |
| 6,844,063 B2 | 1/2005 | Matsui et al. |
| 6,849,329 B2 | 2/2005 | Perez et al. |
| 6,860,906 B2 | 3/2005 | Malisz et al. |
| 6,861,142 B1 | 3/2005 | Wilkie et al. |
| 6,890,649 B2 | 5/2005 | Hobbs et al. |
| 6,893,711 B2 | 5/2005 | Williamson et al. |
| 6,949,288 B2 | 9/2005 | Hodge et al. |
| 6,953,622 B2 | 10/2005 | Tsai et al. |
| 6,989,193 B2 | 1/2006 | Haile et al. |
| 6,989,194 B2 | 1/2006 | Bansal et al. |
| 7,011,885 B2 | 3/2006 | Chang et al. |
| 7,025,885 B2 | 4/2006 | Cote et al. |
| 7,087,301 B2 | 8/2006 | Musgrave et al. |
| 7,097,904 B2 | 8/2006 | Ochi et al. |
| 7,144,614 B2 | 12/2006 | Nakajima et al. |
| 7,160,612 B2 | 1/2007 | Magill et al. |
| 7,163,744 B2 | 1/2007 | Nightingale et al. |
| 7,179,376 B2 | 2/2007 | Kaleem et al. |
| 7,193,029 B2 | 3/2007 | Hayes |
| 7,195,814 B2 | 3/2007 | Ista et al. |

| | | |
|---|---|---|
| 7,214,765 B2 | 5/2007 | Ringeisen et al. |
| 7,238,415 B2 | 7/2007 | Rodriguez et al. |
| 7,238,423 B2 | 7/2007 | Calhoun et al. |
| 7,241,497 B2 | 7/2007 | Magill et al. |
| 7,285,209 B2 | 10/2007 | Yu et al. |
| 7,291,270 B2 | 11/2007 | Gibson et al. |
| 7,291,389 B1 | 11/2007 | Bitler et al. |
| 7,309,372 B2 | 12/2007 | Kahlbaugh et al. |
| 7,314,497 B2 | 1/2008 | Kahlbaugh et al. |
| 7,329,723 B2 | 2/2008 | Jernigan et al. |
| 7,338,664 B2 | 3/2008 | Tseng et al. |
| 7,344,775 B2 | 3/2008 | Stevens et al. |
| 7,357,985 B2 | 4/2008 | Kurian et al. |
| 7,358,022 B2 | 4/2008 | Farrugia et al. |
| 7,358,323 B2 | 4/2008 | Maeda et al. |
| 7,358,325 B2 | 4/2008 | Hayes |
| 7,361,700 B2 | 4/2008 | Sunamori et al. |
| 7,365,118 B2 | 4/2008 | McCleskey et al. |
| 7,387,976 B2 | 6/2008 | Baba et al. |
| 7,405,171 B2 | 7/2008 | Tsujiyama et al. |
| 7,405,266 B2 | 7/2008 | Bentley et al. |
| 2002/0009590 A1 | 1/2002 | Matsui et al. |
| 2002/0030016 A1 | 3/2002 | Schmidt |
| 2002/0079121 A1 | 6/2002 | Ryan et al. |
| 2002/0123290 A1 | 9/2002 | Tsai et al. |
| 2002/0127939 A1 | 9/2002 | Hwo et al. |
| 2002/0146552 A1 | 10/2002 | Mumick et al. |
| 2003/0026986 A1 | 2/2003 | Matsui et al. |
| 2003/0057155 A1 | 3/2003 | Husain et al. |
| 2003/0077444 A1 | 4/2003 | Bond et al. |
| 2003/0091822 A1 | 5/2003 | Bond et al. |
| 2003/0092343 A1 | 5/2003 | Bond et al. |
| 2003/0104204 A1 | 6/2003 | Bond et al. |
| 2003/0111763 A1 | 6/2003 | Jen |
| 2003/0166370 A1 | 9/2003 | Harris et al. |
| 2003/0176132 A1 | 9/2003 | Moriyasu et al. |
| 2003/0196955 A1 | 10/2003 | Hughes |
| 2004/0081829 A1 | 4/2004 | Klier et al. |
| 2004/0211729 A1 | 10/2004 | Sunkara et al. |
| 2004/0258910 A1 | 12/2004 | Haile et al. |
| 2004/0260034 A1 | 12/2004 | Haile et al. |
| 2005/0027098 A1 | 2/2005 | Hayes |
| 2005/0115902 A1 | 6/2005 | Kaleem et al. |
| 2005/0148261 A1 | 7/2005 | Close et al. |
| 2005/0171250 A1 | 8/2005 | Hayes |
| 2005/0208300 A1 | 9/2005 | Magill et al. |
| 2005/0221709 A1 | 10/2005 | Jordan et al. |
| 2005/0227068 A1 | 10/2005 | Dugan |
| 2005/0282008 A1 | 12/2005 | Haile et al. |
| 2005/0287895 A1 | 12/2005 | Bansal |
| 2006/0011544 A1 | 1/2006 | Sharma et al. |
| 2006/0021938 A1 | 2/2006 | Diallo |
| 2006/0049386 A1 | 3/2006 | Kody et al. |
| 2006/0051575 A1 | 3/2006 | Yoon et al. |
| 2006/0060529 A1 | 3/2006 | Cote et al. |
| 2006/0065600 A1 | 3/2006 | Sunkara et al. |
| 2006/0083917 A1 | 4/2006 | Dugan |
| 2006/0093814 A1 | 5/2006 | Chang |
| 2006/0093819 A1 | 5/2006 | Atwood et al. |
| 2006/0113033 A1 | 6/2006 | Bruner |
| 2006/0128247 A1 | 6/2006 | Skoog et al. |
| 2006/0135020 A1 | 6/2006 | Weinberg et al. |
| 2006/0147709 A1 | 7/2006 | Mizumura et al. |
| 2006/0159918 A1 | 7/2006 | Dugan et al. |
| 2006/0177656 A1 | 8/2006 | Kolmes et al. |
| 2006/0194047 A1 | 8/2006 | Gupta et al. |
| 2006/0204753 A1 | 9/2006 | Simmonds et al. |
| 2006/0210797 A1 | 9/2006 | Masuda et al. |
| 2006/0234049 A1 | 10/2006 | Van Dun et al. |
| 2006/0234050 A1 | 10/2006 | Frankel |
| 2006/0263601 A1 | 11/2006 | Wang et al. |
| 2007/0009736 A1 | 1/2007 | Chuang et al. |
| 2007/0020453 A1 | 1/2007 | Sen et al. |
| 2007/0031637 A1 | 2/2007 | Anderson |
| 2007/0031668 A1 | 2/2007 | Hietpas et al. |
| 2007/0048523 A1 | 3/2007 | Pollet et al. |
| 2007/0056906 A1 | 3/2007 | Kaleem et al. |
| 2007/0062872 A1 | 3/2007 | Parker et al. |
| 2007/0098982 A1 | 5/2007 | Nishida et al. |
| 2007/0102361 A1 | 5/2007 | Kiefer et al. |
| 2007/0110980 A1 | 5/2007 | Shah |
| 2007/0110998 A1 | 5/2007 | Steele et al. |
| 2007/0114177 A1 | 5/2007 | Sabottke |
| 2007/0122613 A1 | 5/2007 | Stevens et al. |
| 2007/0122614 A1 | 5/2007 | Peng et al. |
| 2007/0128404 A1 | 6/2007 | Tung et al. |
| 2007/0179275 A1 | 8/2007 | Gupta et al. |
| 2007/0182040 A1 | 8/2007 | Suzuki et al. |
| 2007/0190319 A1 | 8/2007 | Kalayci |
| 2007/0232179 A1 | 10/2007 | Polat et al. |
| 2007/0232180 A1 | 10/2007 | Polat et al. |
| 2007/0243377 A1 | 10/2007 | Nishida et al. |
| 2007/0254153 A1 | 11/2007 | Nadkarni et al. |
| 2007/0258935 A1 | 11/2007 | McEntire et al. |
| 2007/0259029 A1 | 11/2007 | McEntire et al. |
| 2007/0259177 A1 | 11/2007 | Gupta et al. |
| 2007/0264520 A1 | 11/2007 | Wood et al. |
| 2007/0278151 A1 | 12/2007 | Musale |
| 2007/0278152 A1 | 12/2007 | Musale |
| 2008/0000836 A1 | 1/2008 | Wang et al. |
| 2008/0003912 A1 | 1/2008 | Tseng et al. |
| 2008/0009574 A1 | 1/2008 | Huenefeld et al. |
| 2008/0009650 A1 | 1/2008 | Sluijmers et al. |
| 2008/0011680 A1 | 1/2008 | Partridge et al. |
| 2008/0038974 A1 | 2/2008 | Eagles |
| 2008/0039540 A1 | 2/2008 | Reitz |
| 2008/0064285 A1 | 3/2008 | Morton et al. |
| 2008/0134652 A1 | 6/2008 | Lim et al. |
| 2008/0160278 A1 | 7/2008 | Cheng et al. |
| 2008/0160859 A1 | 7/2008 | Gupta et al. |
| 2008/0229672 A1 | 9/2008 | Woo et al. |
| 2008/0233850 A1 | 9/2008 | Woo et al. |

FOREIGN PATENT DOCUMENTS

| | | | |
|---|---|---|---|
| EP | 0610894 A | | 8/1994 |
| EP | 1 243 675 A1 | | 9/2002 |
| EP | 1 731 634 | | 12/2006 |
| FR | 2 654 674 A1 | | 5/1991 |
| JP | 52-066719 | | 6/1977 |
| JP | 58-83046 A | | 5/1983 |
| JP | 58-220818 | | 12/1983 |
| JP | 61-047822 | | 3/1986 |
| JP | 62-078213 | | 4/1987 |
| JP | S63-227898 A | | 9/1988 |
| JP | 01-162825 | | 6/1989 |
| JP | 1-229899 A | | 9/1989 |
| JP | 1-289838 A | | 11/1989 |
| JP | 2-210092 A | | 8/1990 |
| JP | 3-16378 B2 | | 3/1991 |
| JP | 3-180587 A | | 8/1991 |
| JP | 5-18334 B2 | | 3/1993 |
| JP | 5321106 A | | 12/1993 |
| JP | 6-25396 A | | 2/1994 |
| JP | 9-77963 A | | 3/1997 |
| JP | 9-100397 A | | 4/1997 |
| JP | 9-249742 A | | 9/1997 |
| JP | 09-291472 | | 11/1997 |
| JP | 09-310230 | | 12/1997 |
| JP | 2000-95850 | | 4/2000 |
| JP | 3131100 B2 | | 1/2001 |
| JP | 2001-123335 | | 5/2001 |
| JP | 2004-137319 | | 5/2004 |
| JP | 2005-002510 | | 1/2005 |
| KR | 2001-0044145 | | 6/2001 |
| WO | WO 93/07197 A1 | | 4/1993 |

| WO | WO 94/24218 A | 10/1994 |
| WO | 1995/003172 A1 | 2/1995 |
| WO | WO 99/47621 A1 | 9/1999 |
| WO | WO 01/66666 A2 | 9/2001 |
| WO | WO 2005/066403 A1 | 7/2002 |
| WO | WO 02/060497 A2 | 8/2002 |
| WO | WO 2004/113598 A2 | 12/2004 |

OTHER PUBLICATIONS

PCT International Search Report dated Feb. 4, 2008 for International Application No. PCT/US2007/001082.

U.S. Appl. No. 11/204,868, filed Aug. 16, 2005, William Alston Haile, et al.
U.S. Appl. No. 11/344,320, filed Jan. 31, 2006, Rakesh Kumar Gupta, et al.
U.S. Appl. No. 11/648,955, filed Jan. 3, 2007, Rakesh Kumar Gupta, et al.
U.S Appl. No. 11/648,953, filed Jan. 3, 2007, Rakesh Kumar Gupta, et al.
U.S. Appl. No. 08/550,042, filed Oct. 30, 1995, Michael C. Cook.
PCT International Search Report dated Nov. 6, 2008 for International Application No. PCT/US2007/025661.
U.S. Appl. No. 61/172,257, filed Apr. 24, 2009, Rakesh Kumar Gupta, et al.

SULFOPOLYESTER RECOVERY

FIELD OF THE INVENTION

The present invention generally pertains to processes for recovering sulfopolyester polymer from aqueous dispersions and concentrated aqueous sulfopolyester dispersions. More specifically, processes according to the present invention involve the concentration of dilute aqueous dispersions of sulfopolyester and the recovery of sulfopolyester therefrom. The present invention further pertains to the recovered sulfopolyesters, aqueous dispersions of sulfopolyesters, sulfopolyester concentrates and articles comprising recovered sulfopolyesters and sulfopolyester concentrations.

BACKGROUND OF THE INVENTION

Water-dispersible polymers, particularly sulfopolyester polymers, are used in the formation of fibers and fibrous articles such as non-woven fabric, bicomponent fibers, films, clothing articles, personal care products such as wipes, feminine hygiene products, diapers, adult incontinence briefs, hospital/surgical and other medical disposables, protective fabrics and layers, geotextiles, industrial wipes, and filter media. Oftentimes, many of these items are washed during the course of their manufacture or use. As a result, significant quantities of the sulfopolyester polymers become liberated from the articles and dispersed in the wash water.

For example, multicomponent fibers comprising a water-dispersible sulfopolyester and a water non-dispersible polymer, such as polyester, nylon or polyolefins, can be used in the manufacture of microdenier fibers and microdenier fiber webs. These fibers have been described, for example, in U.S. Pat. Nos. 5,916,678, 5,405,698, 4,966,808, 5,525,282, 5,366,804, and 5,486,418. The multicomponent fibers can be laid into a non-woven web which may be transformed into a microdenier fiber web by removing the sulfopolyester component of the fibers. This is most commonly accomplished by washing the web thereby causing the sulfopolyester to disassociate from the multicomponent fibers from which the web is made. The disassociated sulfopolyester becomes dispersed in the wash water.

The sulfopolyester dispersion is generally very dilute exhibiting only a very modest concentration of sulfopolyester. Heretofore, the sulfopolyester present in the wash water has been considered to be of little economic value and is typically discarded along with the wash water. Accordingly, there is a need for an economically viable method of recovering the sulfopolyester from the wash water for subsequent reuse.

BRIEF SUMMARY OF THE INVENTION

The present invention overcomes the previously described problems by providing methods of recovering water-dispersible sulfopolyester from aqueous dispersions. Sulfopolyester concentrates made from aqueous dispersions comprising sulfopolyesters are also provided.

It is, therefore, an object of the present invention to provide methods for recovering a water-dispersible sulfopolyester from an aqueous dispersion.

It is another object of the present invention to recover sulfopolyester contained in the aqueous dispersion for reuse in a manufacturing process.

It is another object of the present invention to form a sulfopolyester concentrate dispersion from the aqueous dispersion.

It is yet another object of the present invention to provide the recovered sulfopolyesters, sulfopolyester concentrate, and articles manufactures from the recovered sulfopolyester and sulfopolyester concentrate.

It should be understood that the above-listed objects are only exemplary, and not all the objects listed above need be accomplished by the invention described and claimed herein.

In accordance with one embodiment of this invention, a process for recovering a water-dispersible sulfopolyester from an aqueous dispersion is provided. The process comprises: A process for recovering a water-dispersible sulfopolyester comprising the steps of: (a) providing an aqueous dispersion comprising the water-dispersible sulfopolyester; and (b) recovering at least a portion of the sulfopolyester from the aqueous dispersion to produce a recovered sulfopolyester.

In accordance with another embodiment of this invention, a process for recovering a water-dispersible sulfopolyester from an aqueous dispersion is provided. The process comprises: (a) providing an aqueous dispersion comprising the water-dispersible sulfopolyester; (b) removing water from the aqueous dispersion thereby forming a sulfopolyester concentrate having a sulfopolyester concentration at least twice that of the aqueous dispersion; and (c) recovering at least a portion of the sulfopolyester from the sulfopolyester concentrate to produce a recovered sulfopolyester.

In another embodiment according to the present invention, there is provided a process for recovering a water-dispersible sulfopolyester comprising the steps of: (a) forming an aqueous dispersion comprising the sulfopolyester; (b) passing the dispersion through a nanofiltration element thereby forming a sulfopolyester concentrate having a sulfopolyester concentration that is greater than that of the dispersion; (c) recovering at least a portion of the sulfopolyester from the sulfopolyester concentrate to produce a recovered sulfopolyester.

Yet another embodiment of the present invention is directed toward a process for recovering a water-dispersible sulfopolyester comprising the steps of: (a) washing an article comprising the sulfopolyester thereby disassociating at least a portion of the sulfopolyester from the article and forming an aqueous dispersion comprising the disassociated sulfopolyester; (b) removing water from the aqueous dispersion to form a sulfopolyester concentrate having a sulfopolyester concentration that is greater than the aqueous dispersion; (c) recovering at least a portion of the sulfopolyester from the sulfopolyester concentrate to produce a recovered sulfopolyester.

Still another embodiment according to the present invention is directed toward a process for forming a sulfopolyester concentrate comprising the steps of: (a) forming an aqueous dispersion comprising a sulfopolyester; and (b) removing water from the aqueous dispersion to form a sulfopolyester concentrate having a sulfopolyester concentration that is at least twice that of the aqueous dispersion to produce the sulfopolyester concentrate.

In another embodiment according to the present invention, there is provided an aqueous dispersion comprising at least about 10 weight % of a Sulfopolyester. In another embodiment of the present invention, a recovered sulfopolyester is provided. Still another embodiment according to present invention is to recover sulfopolyester of sufficiently good quality so as to be of use in article of manufacture, for example, fibers, nonwovens, films, textiles, adhesives and the likes.

DETAILED DESCRIPTION

The present invention provides processes for recovering a water-dispersible sulfopolyester polymer from an aqueous dispersion. In one embodiment of the present invention, processes are provided for forming a sulfopolyester concentrate from an aqueous dispersion from which the sulfopolyester is recovered. In yet another embodiment, the aqueous dispersion from which the sulfopolyester is to be concentrated and/or recovered is formed from an industrial process whereby a water-dispersible sulfopolyester polymer becomes dispersed by the action of water. In a preferred embodiment, the sulfopolyester is initially contained within an article that comprises a water-dispersible sulfopolyester. More preferably, this article comprises sulfopolyester as one component of a multicomponent fiber.

As used herein, the term "water-dispersible" in reference to the sulfopolyester polymer is intended to be synonymous with the terms "water-dissipatable", "water-disintegratable", "water-dissolvable", "water-dispellable", "water soluble", "water-removable", "hydro-soluble", and "hydrodispersible". It is also intended to mean that the sulfopolyester component is removed from the article or multicomponent fiber and is dispersed or dissolved by the action of water. In the case of a multicomponent fiber, the sulfopolyester is removed so as to enable the release and separation of the water non-dispersible fibers contained therein. The terms "dispersed", "dispersible", "dissipate", or "dissipatable" mean that, using a sufficient amount of deionized water (e.g., 100:1 water:fiber by weight) to form a loose suspension or slurry of the fibers or fibrous article, at a temperature of about 60° C., and within a time period of up to 5 days, the sulfopolyester component dissolved, disintegrates, disassociates, or separates from the multicomponent fiber, leaving behind a plurality of microdenier fibers from the water non-dispersible segments.

As used herein, the term "aqueous dispersion" means that sulfopolyester has been dispersed in water and no further process steps have been taken to increase the concentration of sulfopolyester.

As used herein, the term "sulfopolyester concentrate" means that the aqueous dispersion has been further processed to remove water to increase the concentration of the sulfopolyester.

The water-dispersible sulfopolyester used in accordance with the present invention is prepared from sulfopolyesters, comprising dicarboxylic acid monomer residues, sulfomonomer residues, diol monomer residues, and repeating units. The sulfomonomer may be a dicarboxylic acid, a diol, or hydroxycarboxylic acid. Thus, the term "monomer residue", as used herein, means a residue of a dicarboxylic acid, a diol, or a hydroxycarboxylic acid. A "repeating unit", as used herein, means an organic structure having 2 monomer residues bonded through a carbonyloxy group. The sulfopolyesters for use with the present invention contain substantially equal molar proportions of acid residues (100 mole %) and diol residues (100 mole %) which react in substantially equal proportions such that the total moles of repeating units is equal to 100 mole %. AQ-55 sulfopolyester, available from Eastman Chemical Co., Kingsport, Tenn., is an exemplary sulfopolyester. AQ-55 sulfopolyester is a linear, water dispersible sulfopolyester containing 5-sodiosulfo isophthalic acid. AQ-55 sulfopolyester is available in pellet form and also as a dispersion.

The mole percentages provided in the present disclosure, therefore, may be based on the total moles of acid residues, the total moles of diol residues, or the total moles of repeating units. For example, a sulfopolyester containing 30 mole % of a sulfomonomer, which may be a dicarboxylic acid, a diol, or hydroxycarboxylic acid, based on the total repeating units, means that the sulfopolyester contains 30 mole % sulfomonomer out of a total of 100 mole % repeating units. Thus, there are 30 moles of sulfomonomer residues among every 100 moles of repeating units. Similarly, a sulfopolyester containing 30 mole % of a dicarboxylic acid sulfomonomer, based on the total acid residues, means the sulfopolyester contains 30 mole % sulfomonomer out of a total of 100 mole % acid residues. Thus, in this latter case, there are 30 moles of sulfomonomer residues among every 100 moles of acid residues.

The sulfopolyesters described herein have an inherent viscosity, abbreviated hereinafter as "Ih.V.", of at least about 0.1 dL/g, preferably at least about 0.2, more preferably, at least about 0.3 dL/g, and most preferably greater than about 0.3 dL/g, measured in a 60/40 parts by weight solution of phenol/tetrachloroethane solvent at 25° C. and at a concentration of about 0.5 g of sulfopolyester in 100 mL of solvent. The term "polyester", as used herein, encompasses both "homopolyesters" and "copolyesters" and means a synthetic polymer prepared by the polycondensation of difunctional carboxylic acids with difunctional hydroxyl compound. As used herein, the term "sulfopolyester" means any polyester comprising a sulfomonomer. Typically the difunctional carboxylic acid is a dicarboxylic acid and the difunctional hydroxyl compound is a dihydric alcohol such as, for example glycols and diols. Alternatively, the difunctional carboxylic acid may be a hydroxy carboxylic acid such as, for example, p-hydroxybenzoic acid, and the difunctional hydroxyl compound may be a aromatic nucleus bearing 2 hydroxy substituents such as, for example, hydroquinone. The term "residue", as used herein, means any organic structure incorporated into the polymer through a polycondensation reaction involving the corresponding monomer. Thus, the dicarboxylic acid residue may be derived from a dicarboxylic acid monomer or its associated acid halides, esters, salts, anhydrides, or mixtures thereof. As used herein, therefore, the term dicarboxylic acid is intended to include dicarboxylic acids and any derivative of a dicarboxylic acid, including its associated acid halides, esters, half-esters, salts, half-salts, anhydrides, mixed anhydrides, or mixtures thereof, useful in a polycondensation process with a diol to make a high molecular weight polyester.

The sulfopolyester of the present invention includes one or more dicarboxylic acid residues. Depending on the type and concentration of the sulfomonomer, the dicarboxylic acid residue may comprise from about 60 to about 100 mole % of the acid residues. Other examples of concentration ranges of dicarboxylic acid residues are from about 60 mole % to about 95 mole %, and about 70 mole % to about 95 mole %. Examples of dicarboxylic acids that may be used include aliphatic dicarboxylic acids, alicyclic dicarboxylic acids, aromatic dicarboxylic acids, or mixtures of two or more of these acids. Thus, suitable dicarboxylic acids include, but are not limited to, succinic; glutaric; adipic; azelaic; sebacic; fumaric; maleic; itaconic; 1,3-cyclohexanedicarboxylic; 1,4-cyclohexanedicarboxylic; diglycolic; 2,5-norbornanedicarboxylic; phthalic; terephthalic; 1,4-naphthalenedicarboxylic; 2,5-naphthalenedicarboxylic; diphenic; 4,4'-oxydibenzoic; 4,4'-sulfonyidibenzoic; and isophthalic. The preferred dicarboxylic acid residues are isophthalic, terephthalic, and 1,4-cyclohexanedicarboxylic acids, or if diesters are used, dimethyl terephthalate, dimethyl isophthalate, and dimethyl-1,4-cyclohexanedicarboxylate with the residues of isophthalic and terephthalic acid being especially preferred. Although the dicarboxylic acid methyl ester is the most preferred embodiment, it is also acceptable to include higher order alkyl esters, such as ethyl, propyl, isopropyl, butyl, and so forth. In addition, aromatic esters, particularly phenyl, also may be employed.

The sulfopolyester includes about 4 to about 40 mole %, based on the total repeating units, of residues of at least one sulfomonomer having 2 functional groups and one or more sulfonate groups attached to an aromatic or cycloaliphatic ring wherein the functional groups are hydroxyl, carboxyl, or a combination thereof. Additional examples of concentration ranges for the sulfomonomer residues are about 4 to about 35 mole %, about 8 to about 30 mole %, and about 8 to about 25 mole %, based on the total repeating units. The sulfomonomer may be a dicarboxylic acid or ester thereof containing a sulfonate group, a diol containing a sulfonate group, or a hydroxy acid containing a sulfonate group. The term "sulfonate" refers to a salt of a sulfonic acid having the structure "—$SO_3M$" wherein M is the cation of the sulfonate salt. The cation of the sulfonate salt may be a metal ion such as $Li^+$, $Na^+$, $K^+$, $Mg^{++}$, $Ca^{++}$, $Ni^{++}$, $Fe^{++}$, and the like. Alternatively, the cation of the sulfonate salt may be non-metallic such as a nitrogenous base as described, for example, in U.S. Pat. No. 4,304,901. Nitrogen-based cations are derived from nitrogen-containing bases, which may be aliphatic, cycloaliphatic, or aromatic compounds. Examples of such nitrogen containing bases include ammonia, dimethylethanolamine, diethanolamine, triethanolamine, pyridine, morpholine, and piperidine. Because monomers containing the nitrogen-based sulfonate salts typically are not thermally stable at conditions required to make the polymers in the melt, the method of this invention for preparing sulfopolyesters containing nitrogen-based sulfonate salt groups is to disperse, dissipate, or dissolve the polymer containing the required amount of sulfonate group in the form of its alkali metal salt in water and then exchange the alkali metal cation for a nitrogen-based cation.

When a monovalent alkali metal ion is used as the cation of the sulfonate salt, the resulting sulfopolyester is completely dispersible in water with the rate of dispersion dependent on the content of sulfomonomer in the polymer, temperature of the water, surface area/thickness of the sulfopolyester, and so forth. When a divalent metal ion is used, the resulting sulfopolyesters are not readily dispersed by cold water but are more easily dispersed by hot water. Utilization of more than one counterion within a single polymer composition is possible and may offer a means to tailor or fine-tune the water-responsivity of the resulting article of manufacture. Examples of sulfomonomers residues include monomer residues where the sulfonate salt group is attached to an aromatic acid nucleus, such as, for example, benzene; naphthalene; diphenyl; oxydiphenyl; sulfonyldiphenyl; and methylenediphenyl or cycloaliphatic rings, such as, for example, cyclohexyl; cyclopentyl; cyclobutyl; cycloheptyl; and cyclooctyl. Other examples of sulfomonomer residues which may be used in the present invention are the metal sulfonate salt of sulfophthalic acid, sulfoterephthalic acid, sulfoisophthalic acid, or combinations thereof. Other examples of sulfomonomers which may be used are 5-sodiosulfoisophthalic acid and esters thereof. If the sulfomonomer residue is from 5-sodiosulfoisophthalic acid, typical sulfomonomer concentration ranges are about 4 to about 35 mole %, about 8 to about 30 mole %, and about 8 to 25 mole %, based on the total moles of acid residues.

The sulfomonomers used in the preparation of the sulfopolyesters are known compounds and may be prepared using methods well known in the art. For example, sulfomonomers in which the sulfonate group is attached to an aromatic ring may be prepared by sulfonating the aromatic compound with oleum to obtain the corresponding sulfonic acid and followed by reaction with a metal oxide or base, for example, sodium acetate, to prepare the sulfonate salt. Procedures for preparation of various sulfomonomers are described, for example, in U.S. Pat. Nos. 3,779,993; 3,018,272; and 3,528,947.

It is also possible to prepare the polyester using, for example, a sodium sulfonate salt, and ion-exchange methods to replace the sodium with a different ion, such as zinc, when the polymer is in the dispersed form. This type of ion exchange procedure is generally superior to preparing the polymer with divalent salts insofar as the sodium salts are usually more soluble in the polymer reactant melt-phase.

The sulfopolyester includes one or more diol residues which may include aliphatic, cycloaliphatic, and aralkyl glycols. The cycloaliphatic diols, for example, 1,3- and 1,4-cyclohexanedimethanol, may be present as their pure cis or trans isomers or as a mixture of cis and trans isomers. As used herein, the term "diol" is synonymous with the term "glycol" and means any dihydric alcohol. Examples of diols include, but are not limited to, ethylene glycol; diethylene glycol; triethylene glycol; polyethylene glycols; 1,3-propanediol; 2,4-dimethyl-2-ethylhexane-1,3-diol; 2,2-dimethyl-1,3-propanediol; 2-ethyl-2-butyl-1,3-propanediol; 2-ethyl-2-isobutyl-1,3-propanediol; 1,3-butanediol; 1,4-butanediol; 1,5-pentanediol; 1,6-hexanediol; 2,2,4-trimethyl-1,6-hexanediol; thiodiethanol; 1,2-cyclohexanedimethanol; 1,3-cyclohexanedimethanol; 1,4-cyclohexanedimethanol; 2,2,4,4-tetramethyl-1,3-cyclobutanediol; p-xylylenediol, or combinations of one or more of these glycols.

The diol residues may include from about 25 mole % to about 100 mole %, based on the total diol residues, of residue of a poly(ethylene glycol) having a structure

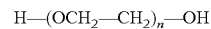

wherein n is an integer in the range of 2 to about 500. Non-limiting examples of lower molecular weight polyethylene glycols, e.g., wherein n is from 2 to 6, are diethylene glycol, triethylene glycol, and tetraethylene glycol. Of these lower molecular weight glycols, diethylene and triethylene glycol are most preferred. Higher molecular weight polyethylene glycols (abbreviated herein as "PEG"), wherein n is from 7 to about 500, include the commercially available products known under the designation CARBOWAX®, a product of Dow Chemical Company (formerly Union Carbide). Typically, PEGs are used in combination with other diols such as, for example, diethylene glycol or ethylene glycol. Based on the values of n, which range from greater than 6 to 500, the molecular weight may range from greater than 300 to about 22,000 g/mol. The molecular weight and the mole % are inversely proportional to each other; specifically, as the molecular weight is increased, the mole % will be decreased in order to achieve a designated degree of hydrophilicity. For example, it is illustrative of this concept to consider that a PEG having a molecular weight of 1000 may constitute up to 10 mole % of the total diol, while a PEG having a molecular weight of 10,000 would typically be incorporated at a level of less than 1 mole % of the total diol.

Certain dimer, trimer, and tetramer diols may be formed in situ due to side reactions that may be controlled by varying the process conditions. For example, varying amounts of diethylene, triethylene, and tetraethylene glycols may be formed from ethylene glycol from an acid-catalyzed dehydration reaction which occurs readily when the polycondensation reaction is carried out under acidic conditions. The presence of buffer solutions, well-known to those skilled in the art, may be added to the reaction mixture to retard these side reactions. Additional compositional latitude is possible, however, if the buffer is omitted and the dimerization, trimerization, and tetramerization reactions are allowed to proceed.

The sulfopolyester of the present invention may include from 0 to about 25 mole %, based on the total repeating units, of residues of a branching monomer having 3 or more functional groups wherein the functional groups are hydroxyl, carboxyl, or a combination thereof. Non-limiting examples of branching monomers are 1,1,1-trimethylol propane, 1,1,1-trimethylolethane, glycerin, pentaerythritol, erythritol, threitol, dipentaerythritol, sorbitol, trimellitic anhydride, pyromellitic dianhydride, dimethylol propionic acid, or combinations thereof. Further examples of branching monomer concentration ranges are from 0 to about 20 mole % and from 0 to about 10 mole %. The presence of a branching monomer may result in a number of possible benefits to the sulfopolyester of the present invention, including but not limited to, the ability to tailor rheological, solubility, and tensile properties. For example, at a constant molecular weight, a branched sulfopolyester, compared to a linear analog, will also have a greater concentration of end groups that may facilitate post-polymerization crosslinking reactions. At high concentrations of branching agent, however, the sulfopolyester may be prone to gelation.

The sulfopolyester of the present invention has a glass transition temperature, abbreviated herein as "Tg", of at least 25° C. as measured on the dry polymer using standard techniques, such as differential scanning calorimetry ("DSC"), well known to persons skilled in the art. The Tg measurements of the sulfopolyesters of the present invention are conducted using a "dry polymer", that is, a polymer sample in which adventitious or absorbed water is driven off by heating to polymer to a temperature of about 200° C. and allowing the sample to return to room temperature. Typically, the sulfopolyester is dried in the DSC apparatus by conducting a first thermal scan in which the sample is heated to a temperature above the water vaporization temperature, holding the sample at that temperature until the vaporization of the water absorbed in the polymer is complete (as indicated by an a large, broad endotherm), cooling the sample to room temperature, and then conducting a second thermal scan to obtain the Tg measurement. Further examples of glass transition temperatures exhibited by the sulfopolyester are at least 30° C., at least 35° C., at least 40° C., at least 50° C., at least 60° C., at least 65° C., at least 80° C., and at least 90° C. Although other Tg's are possible, typical glass transition temperatures of the dry sulfopolyesters our invention are about 30° C., about 48° C., about 55° C., about 65° C., about 70° C., about 75° C., about 85° C., and about 90° C.

In another embodiment of the invention, the sulfopolyester comprises:

(i) residues of one or more dicarboxylic acids;

(ii) about 2 to about 20 mole %, based on the total moles of diacid or diol residues, of residues of at least one sulfomonomer having 2 functional groups and one or more sulfonate groups attached to an aromatic or cycloaliphatic ring wherein the functional groups are hydroxyl, carboxyl, or a combination thereof;

(iii) one or more diol residues wherein at least 25 mole %, based on the total diol residues, is a poly(ethylene glycol) having a structure

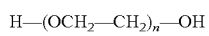

wherein n is an integer in the range of 2 to about 500; and (iv) 0 to about 25 mole %, based on the total repeating units, of residues of a branching monomer having 3 or more functional groups wherein the functional groups are hydroxyl, carboxyl, or a combination thereof.

In another preferred embodiment, the sulfopolyester has a glass transition temperature (Tg) of at least 25° C. and comprises:

(I) residues of one or more dicarboxylic acids;

(ii) about 4 to about 40 mole %, based on the total repeating units, of residues of at least one sulfomonomer having 2 functional groups and one or more metal sulfonate groups attached to an aromatic or cycloaliphatic ring wherein the functional groups are hydroxyl, carboxyl, or a combination thereof;

(iii) one or more diol residues wherein at least 20 mole %, based on the total diol residues, is a poly(ethylene glycol) having a structure

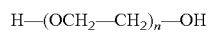

wherein n is an integer in the range of 2 to about 500;

(iv) 0 to about 25 mole %, based on the total repeating units, of residues of a branching monomer having 3 or more functional groups wherein the functional groups are hydroxyl, carboxyl, or a combination thereof.

Additional sulfopolyester polymers and multicomponent fibers formed therewith are described in U.S. patent application Ser. Nos. 11/204,868, filed Aug. 16, 2005, Ser. No. 10/850,548, filed May 20, 2004, and Ser. No. 10/465,698, filed Jun. 19, 2003, all of which are hereby incorporated by reference.

The aqueous dispersion comprising the water-dispersible sulfopolyester preferably comprises less than about 10 weight % of the sulfopolyester, more preferably less than about 5 weight %, and most preferably less than about 2 weight %. This aqueous dispersion may be formed by washing an article comprising the sulfopolyester in water (most preferably deionized water) thereby disassociating at least a portion of the sulfopolyester from the article. Typically, the washing process comprises contacting the article with water at a temperature of about 25° C. to about 100° C., more preferably from about 40° C. to about 80° C., for a period of time from about 10 to about 600 seconds whereby the sulfopolyester is dissipated or dissolved.

In one embodiment of the invention, in order to enhance the effectiveness of the sulfopolyester recovery process, water can be removed from the aqueous dispersion thereby forming a sulfopolyester concentrate. As used herein, the term "sulfopolyester concentrate" refers to a second aqueous dispersion formed from the aqueous dispersion comprising the sulfopolyester and has a sulfopolyester concentration that is greater than that of the aqueous dispersion. Preferably, the sulfopolyester concentrate has a sulfopolyester concentration of at least twice that of the aqueous dispersion, more preferably a concentration at least five times that of the aqueous dispersion, even more preferably a concentration of at least ten times that of the aqueous dispersion, and most preferably at least 20 times that of the aqueous dispersion.

The step of removing water from the aqueous dispersion may be performed by several means. Water may be evaporated from the aqueous dispersion by application of heat and/or vacuum to the dispersion. However, heating large quantities of water in order to achieve a sulfopolyester concentrate as described previously is generally not economically effective as the energy costs for evaporating water are high. Therefore, it is preferred to pass the aqueous dispersion through a nanofiltration element, particularly an element comprising a porous nanofiltration membrane. As used herein, the term "nanofiltration" refers to a low to moderately high pressure (typically 50-450 psig) process in which divalent salts and organic materials are rejected. Typically, nanofiltration membranes comprise pore sizes of less than about 50 nm and are used in applications having dispersed materials exhibiting molecular weights of between about 100 to about 20,000. Preferred nanofiltration elements and membranes are available from Applied Membranes Inc., Vista, Calif., and Koch Membrane Systems, Wilmington, Mass.

The filtration element may operate as either cross-flow filtration or dead-end filtration. In addition to continuous operation, cross-flow filtration presents the advantage over dead-end filtration in that there is no filter cake that will clog the membrane. The dispersed sulfopolyester polymer generally presents particle sizes of between about 50 to about 500 nm when in a 1-2% solution. Therefore, it is preferable that the nanofiltration membrane presents pore sizes of less than about 25 nm and more preferably less than about 10 nm.

In operation, the aqueous dispersion may be passed continuously through the nanofiltration element. In each pass, water is forced through the nanofiltration membrane and thus removed from the aqueous dispersion. The sulfopolyester, too large to pass through the membrane, remains dispersed. However, the concentration of sulfopolyester increases with each subsequent pass until the desired sulfopolyester level is achieved. Preferably, the sulfopolyester concentrate presents a sulfopolyester concentration of greater than about 10 weight %, more preferably greater than about 20 weight %, and most preferably greater than about 30 weight %, all based on the weight of the entire sulfopolyester concentrate. It has been found that nanofiltration is particularly effective in forming sulfopolyester concentrates having sulfopolyester levels as high as about 30 to about 40 weight %. This level could be increased further depending upon the type of filtration membrane used and the processing conditions.

At least a portion of the sulfopolyester in the aqueous dispersion or sulfopolyester concentrate is then recovered. In one embodiment according to the present invention, the recovery step comprises evaporation of water from the sulfopolyester concentrate. The evaporation process may include the application of heat and/or a vacuum to the dispersion in order to drive off water. As a significant amount of water has been removed by nanofiltration, the energy costs for performing this recovery step has been greatly reduced. Sufficient water is removed to further concentrate the sulfopolyester in the sulfopolyester concentrate, or the water is entirely removed thereby leaving only dry polymer, essentially. The level to which the water is removed will depend upon the particular article being manufactured with the recovered sulfopolyester. For example, the sulfopolyester may be used in water dispersible adhesives. In this regard, sufficient water should be removed to achieve a sulfopolyester level of at least about 50 weight %. If a solid recovered sulfopolyester product is desired, the recovered material should comprise greater than 99 weight % sulfopolyester. The solid recovered sulfopolyester product may be processed further, as necessary, to render it suitable for manufacturing a particular article or product.

In another embodiment according to the present invention, the sulfopolyester may be recovered by precipitation of at least a portion of the sulfopolyester in the sulfopolyester concentrate. There exists several procedures through which the sulfopolyester can be precipitated. And while most of these procedures can be employed using aqueous dispersions of sulfopolyesters that are dilute, they are generally most effective when used with a sulfopolyester concentrate comprising greater than about 10 weight % of sulfopolyester.

One recovery mechanism generally pertains to precipitation of sulfopolyester with a salt solution. The use of monovalent cations is preferred as divalent cations tend to crosslink the polyester. Preferred monovalent salts include, but are not limited to, potassium salts, sodium salts, lithium salts, and mixtures thereof. Particularly preferred monovalent salts include, but are not limited to, potassium acetate, sodium acetate, potassium sulfate, sodium sulfate and mixtures thereof. The salt may be added to the sulfopolyester concentrate as a solid or as an aqueous solution. Preferably, the salt level in the sulfopolyester concentrate is at least about 30 weight %, based on the weight of the sulfopolyester. More preferably, the salt level is between about 30 to about 60 weight %, and most preferably between about 40 to about 50 weight %, based on the weight of the sulfopolyester. While a single salt may be used, it is preferable to use a blend of potassium and sodium salts in a weight ratio of about 5:1 to about 1:5, more preferably from about 2.5:1 to about 1:2.5, and most preferably about 1:1.

After addition of the salt to the sulfopolyester concentrate, the sulfopolyester concentrate may gel. The sulfopolyester concentrate may then be heated to between about 50° C. to about 80° C. with stirring to break the gel. The sulfopolyester concentrate is then preferably cooled to room temperature and filtered to yield the recovered sulfopolyester. At this point, the recovered sulfopolyester may include significant quantities of salt. It may be desirable to remove this salt, depending upon the manufacturing process in which the recovered sulfopolyester is to be reused. Salt removal is generally done by washing the recovered sulfopolyester in water, preferably deionized water as minerals present in tap water, especially the divalent cations Ca and Fe, may cause the recovered sulfopolyester to crosslink and become brittle. It may be necessary to wash the recovered sulfopolyester multiple times to ensure that the salt is removed. Preferably, the salt level remaining in the recovered sulfopolyester is less than about 2 weight %, more preferably less than about 1 weight %, even more preferably less than about 0.5 weight %, and most preferably the recovered sulfopolyester will be essentially salt-free. After washing, the recovered sulfopolyester can be dried.

Another mechanism for recovery of the sulfopolyester by precipitation is with the use of a non-solvent. Preferably, the non-solvent is miscible with water such as an alcohol, more preferably, isopropanol. The non-solvent causes the sulfopolyester to precipitate, after which the sulfopolyester is recovered by filtration and washed in deionized water to remove the alcohol to produce the recovered sulfopolyester. Care should be taken to remove any trapped alcohol from the recovered sulfopolyester in that any alcohol residues may affect the reuse of the sulfopolyester. Also, this mechanism was found to work well with sulfopolyester samples having inherent viscosities greater than about 0.30. However, with low inherent viscosity materials, the sulfopolyester may dissolve in the non-solvent and therefore become unrecoverable.

The present invention results in a sulfopolyester recovery yield of at least about 50% by weight, more preferably at least about 70% by weight, and most preferably at least about 90% by weight of the sulfopolyester present in the aqueous dispersion.

Finally, the recovered sulfopolyester is reused in a manufacturing process. Exemplary uses for the recovered sulfopolyester include the formation of articles or products such as non-woven fabric, multicomponent fibers, films, adhesives, and clothing.

The methods described herein advantageously tend not to degrade the sulfopolyester polymer such that the recovered sulfopolyester exhibits an average molecular weight of at least about 50% of the molecular weight of the sulfopolyester present in the aqueous dispersion. More preferably, the recovered sulfopolyester retains at least about 75% of its original molecular weight, and most preferably at least about 90%.

In another embodiment of the present invention, a sulfopolyester concentrate comprising at least about 10 weight % of a sulfopolyester is provided. Preferably, a sulfopolyester concentrate comprising at least 20% of a sulfopolyester is provided. This sulfopolyester concentrate may be formed in accordance with any of those methods described above and may comprise any sulfopolyester previously described herein. Preferably, the sulfopolyester concentrate comprises between about 25 to about 65 weight % of a sulfopolyester, and more preferably between about 30 to about 50 weight %.

The recovered sulfopolyester of the present invention can be utilized to produce an article. Non-limiting examples of such articles include multifilament fibers, yarns, cords, tapes, fabrics, melt blown webs, spunbonded webs, thermobonded webs, hydroentangled webs, nonwoven webs and fabrics, and combinations thereof; items having one or more layers of fibers, such as, for example, multilayer nonwovens, laminates, and composites from such fibers, gauzes, bandages, diapers, training pants, tampons, surgical gowns and masks, feminine napkins; and the like. Further, the articles may include replacement inserts for various personal hygiene and cleaning products. The article of the present invention may be bonded, laminated, attached to, or used in conjunction with other materials which may or may not be water-dispersible. The article, for example, a nonwoven fabric layer, may be bonded to a flexible plastic film or backing of a water non-dispersible material, such as polyethylene. Such an assembly, for example, could be used as one component of a disposable diaper. In addition, the article may result from overblowing fibers onto another substrate to form highly assorted combinations of engineered melt blown, spunbond, film, or membrane structures.

EXAMPLES

This invention can be further illustrated by the following examples of preferred embodiments thereof, although it will be understood that these examples are included merely for purposes of illustration and are not intended to limit the scope of the invention unless otherwise specifically indicated.

In examples 1-4, the ability to recover sulfopolyester from aqueous dispersions comprising a 30% by weight concentration of sulfopolyester polymer using salt precipitation was tested. Solutions containing higher concentrations of sulfopolyester were found to be desirable as precipitation occurred almost immediately using a relatively dilute salt solution. The sulfopolyester may be recovered down to a concentration of 5% using a dilute solution, however, this process may take several hours unless a higher level of salt is used.

Example 1

In this example, an aqueous dispersion of 30% by weight Eastman AQ-55S sulfopolyester polymer from Eastman Chemical Company was prepared in deionized water. The sulfopolyester polymer in the aqueous dispersion was precipitated using a 1 mole/liter potassium acetate solution which was added until the sulfopolyester precipitated to produce a recovered sulfopolyester. The recovered sulfopolyester was filtered, washed with deionized water, centrifuged and decanted. The recovered sulfopolyester was washed three more times in the same manner. The recovered sulfopolyester was vacuum dried at 45° C. and 24 mm Hg vacuum resulting in a 87.6% by weight yield. Then, the recovered sulfopolyester was successfully melt spun in to a fiber at 240° C. melt temperature using an Instron Capillary Rheometer at 1900 fpm speed and 0.06 g/min throughput. This rheometer was equipped with a single hole die with the hole diameter of 0.027 inches. The polymer melt was extruded at the defined melt temperature and throughput rate, and the extrudate was cooled quiescently at room temperature while taken up by a take-up roll at the defined speed.

Example 2

A 30% by weight aqueous dispersion of Eastman AQ-55S sulfopolyester polymer was precipitated using a 1 mole/liter potassium acetate solution to yield a recovered sulfopolyester. The recovered sulfopolyester polymer was then filtered through a 180 mesh sieve and washed three times with deionized water. The recovered sulfopolyester polymer was vacuum dried at 45° C. and 24 mm Hg vacuum providing a yield of 74.8% by weight. Then, the recovered sulfopolyester polymer was successfully melt spun in to a fiber at 240° C. using an Instron Capillary Rheometer as in Example 1 at 2000 fpm speed and 0.06 g/min throughput. By way of comparison, the original Eastman AQ-55S-sulfopolyester polymer from which the 30% by weight aqueous dispersion was made, melt spun in to a fiber at 1320 fpm speed and 0.06 g/min throughput at 240° C. using the procedure as described in Example 1.

Example 3

A 30% aqueous dispersion of sulfopolyester polymer having a same chemical composition as Eastman AQ55S and an inherent viscosity of about 0.25 was prepared. 140 grams of this aqueous dispersion were precipitated by adding 30 g of a 1 mole/liter potassium acetate solution to produce a recovered sulfopolyester. This recovered sulfopolyester was filtered, washed thrice with deionized water and vacuum dried at 70° C. and 24 mm Hg vacuum. The recovered sulfopolyester polymer was successfully melt spun in to a fiber at 3000 fpm speed and 0.06 g/min throughput and also successfully melt spun in to a fiber at 240° C., 4200 fpm speed and 0.2 g/min throughput using an Instron Capillary Rheometer as in Example 1.

Example 4

A 30% by weight aqueous dispersion of sulfopolyester polymer of Example 3 was prepared. 150 g of this aqueous dispersion were precipitated by addition of 36 g of a 1 mole/liter potassium acetate solution to produce a recovered sulfopolyester. The recovered sulfopolyester was filtered, washed thrice with deionized water and vacuum dried at 70° C. and 24 mm Hg vacuum. The recovered sulfopolyester polymer was successfully melt spun in to a fiber at 3500 fpm speed and 0.06 g/min throughput and also at 5000 fpm speed and 0.2 g/min throughput using an Instron Capillary Rheometer as in Example 1.

In Example 5, the use of membrane filtration in order to concentrate aqueous dispersions of sulfopolyester polymer prior to precipitation was examined. While membrane filtration may be cross-flow or dead-end filtration, it was found that cross-flow filtration was preferred due its ability to continuously operate without forming a filter cake that would clog the membrane. In the following examples, a cross-flow filtration unit, comprising a 90% rejection nanofiltration membrane Model M-N1812A9, a polypropylene membrane housing and a flow restrictor all available from Applied Membrane Incorporated, was used. The maximum operating pressure for this unit was 100 psi. The unit was set up for single pass, but could be easily converted to a continuous unit using a pump.

Example 5

In this example, the membrane filtration unit was used to concentrate Eastman AQ-55S sulfopolyester polymer aqueous dispersions with 4.9% by weight, 2.5% by weight and 2% by weight solids levels to sulfopolyester concentrates with 20.7% by weight, 10.6% by weight and 7.8% by weight solid levels respectively. Each aqueous dispersion required 5 to 7 passes through the unit to get the final concentration. It was found that it is possible to increase the separation by using two flow restrictors in series thereby increasing the pressure within the system to force greater water removal. After concentration, the sulfopolyester polymer was then precipitated by adding a 1 mole/liter potassium acetate solution as described in Examples 1-4 to produce a recovered sulfopolyester.

Example 6

In this example, a fabric sample (129.7 g) comprising about 30% by weight sulfopolyester polymer of Example 3 and about 70% by weight PET polyester (F61HC available from Eastman Chemical Company) was cut into pieces and washed in 602 g of hot deionized water at about 50-60° C. temperature. The fabric and deionized water were stirred for five minutes to produce an aqueous dispersion. The aqueous dispersion was cooled to room temperature, and the percent solids was determined to be about 7.5% by weight sulfopolyester. The aqueous dispersion was then precipitated by adding a 1 mole/liter potassium acetate solution and then filtered through a 325 mesh sieve to produce a recovered sulfopolyester. The recovered sulfopolyester was washed with deionized water. The washed recovered sulfopolyester was vacuum dried at 50° C. and 23 mm Hg vacuum to recover 20.25 g of sulfopolyester (52.0% by weight yield). The recovered sulfopolyester was analyzed and found to contain about 2% by weight potassium salt. The recovered sulfopolyester was rewashed for a second time to remove this salt and then redried. The recovered material was successfully melt spun in to a fiber at 240° C. at 3000 fpm speed and 0.2 g/min throughput, and also at 5000 fpm speed and 2.0 g/min throughput using an Instron Capillary Rheometer as described in Example 1.

Example 7

In this example, 201.9 g of a fabric comprising about 30% by weight of sulfopolyester polymer comprising about 12 mole % of sodiosulfo isophthalic acid (based on total moles of acids) and 70% by weight polyester was cut into small pieces and washed in hot deionized water bath at about 50-60° C., with stirring, to remove the sulfopolyester polymer from the fabric. After approximately 5 minutes, the fabric samples were removed and the excess water wrung out back in to the hot water bath. The fabric samples were washed a second time in a second hot deionized water bath to remove any sulfopolyester polymer left in the fabric.

The first wash water bath (366.6 g) was found to contain about 10.7% sulfopolyester polymer and the second wash water bath (246.5 g) was found to contain about 3.0% sulfopolyester polymer respectively. The total sulfopolyester polymer in both wash water baths was 46.6 g (76.9% yield). The wash waters from both baths were combined, and the sulfopolyester polymer was precipitated by adding 75 g of a 1 mole/liter potassium acetate solution to produce a recovered sulfopolyester. The recovered sulfopolyester was filtered using a 200 mesh sieve and washed four times with deionized water. The recovered sulfopolyester was placed in a vacuum oven to dry at 50° C. and 23 mm Hg vacuum. The recovered sulfopolyester polymer weighed 38.5 g yielding a final recovery of 63.5%. The material was successfully melt spun in to a fiber at 240° C. and 0.2 g/min throughput at about 5000 fpm speed using an Instron Capillary Rheometer as described in Example 1 thereby producing good quality fibers.

Example 8

In this example, a 1000 g of a 10% by weight aqueous dispersion sample of sulfopolyester comprising about 9 mole % of sodiosulfo isophthalic acid (based on total moles of acids) was precipitated using a solid mixture of sodium sulfate (25 g) and potassium acetate (25 g) with stirring. The aqueous dispersion precipitated within two minutes of salt addition and was then heated to 57° C. The aqueous dispersion was then cooled to room temperature and filtered through a large Buchner funnel using coarse filter paper to produce a recovered sulfopolyester. The recovered sulfopolyester was washed three times with deionized water and dried in a vacuum oven at 50° C. and 23.5 mm Hg vacuum. Recovery using this method was found to be 94.7% by weight. The recovered sulfopolyester polymer was successfully melt spun in to a fiber at 240° C. at 2000 fpm speed and 0.06 g/min throughput and also at 5000 fpm and 2.0 g/min throughput using an Instron Capillary Rheometer as in Example 1. These fibers were completely water dispersible at 70 and 80° C. in deionized water.

Example 9

745 g sample of 10% by weight aqueous dispersion of sulfopolyester polymer was prepared as in Example 8. This sample was precipitated by adding a mixture of sodium sulfate (15 g) and potassium acetate (15 g) while stirring. The sulfopolyester was recovered using the process of Example 9. The recovered sulfopolyester yield was about 95.3% by weight. Another 745 g sample of 10% by weight aqueous dispersion prepared as in Example 9 was precipitated by adding a mixture of sodium sulfate (11.5 g) and potassium acetate (11.5 g) while stirring. The sulfopolyester was recovered using the process of Example 8. The recovered sulfopolyester yield was about 88.3% by weight.

Example 10

In this example, a 1000 g 10% by weight aqueous dispersion sample of sulfopolyester comprising about 7.5 mole % sodiosulfo isophthalic acid (based on total moles of acids) was precipitated using a solid mixture of sodium sulfate (25 g) and potassium acetate (25 g) with stirring. The aqueous dispersion precipitated within two minutes after salt addition to produce a recovered sulfopolyester. This was then heated to about 58° C. After being cooled to room temperature, the sulfopolyester polymer was filtered using a large Buchner funnel and coarse filter paper, washed three times with deionized water, vacuum dried at 50° C. and 23.5 mm Hg vacuum for two days, crumbled and dried an additional six hours at 45° C. The recovered sulfopolyester yield was about 86.7%. This recovered sulfopolyester was successfully melt spun in to a fiber at 240° C. using 2200 fpm speed and 0.06 g/min throughput and also using 4600 fpm speed and 0.2 g/min throughput and also using 5000 fpm speed and 2.0 g/min throughput using an Instron Capillary Rheometer as in Example 1.

Example 11

In this example, the effect of temperature on filtration of precipitated sulfopolyester material was examined. Two 10% by weight aqueous dispersions of the sulfopolyester polymer of Example 8 were precipitated using a 40% by weight potassium acetate solution. After precipitating, each aqueous dispersion was heated to 56° C. One sample was allowed to cool to room temperature before filtration and the other was filtered while hot.

The sample that was filtered while hot took several hours to filter and wash. The sample also stuck to the filter paper and the yield could not be determined. The sample which was filtered at room temperature filtered easily and was washed four times with deionized water. The entire process took approximately 20 minutes without any filtering problems. The sample was vacuum dried at 45° C. and 23.5 mm Hg giving a recovered sulfopolyester yield of about 96.2%.

Example 12

In this example, the effects of using a blend of potassium and sodium salts for precipitation on the properties of the recovered sulfopolyester polymer were examined. One 10% by weight aqueous dispersion sample of sulfopolyester polymer of Example 8 was precipitated with a 1:1 blend of potassium and sodium acetate while a second 10% by weight aqueous dispersion sample was precipitated only with sodium acetate salt. Each sample precipitated within two minutes of the salt addition. Both samples were heated to 55° C. and cooled to room temperature before filtration.

Each sample was filtered and washed four times with deionized water and then vacuum dried at 45° C. and 24 mm Hg vacuum. The sample precipitated with the salt blend filtered very well, and the sulfopolyester was recovered at a 97.2% yield. The sample precipitated using only sodium acetate filtered very slowly. The filtrate was cloudy, and the filter paper needed to be changed during the process. However, this sample also gave a very good yield of recovered sulfopolyester of about 93.3% by weight.

Example 13

In this example, the effect of temperature during precipitation of the sulfopolyester polymer was tested. A 10% by weight aqueous dispersion sample was heated to 55° C. and precipitated with a 1:1 sodium acetate/potassium acetate salt blend. The salt was added as a solid with stirring. Precipitation occurred within two minutes, and the sample was cooled to room temperature. The sample was filtered, washed three times with deionized water and vacuum dried at 45° C. and 24 mm Hg vacuum. Filtration occurred without any problems. Another 10% by weight aqueous dispersion sample of the same sulfopolyester polymer was precipitated using a 40% salt solution of a 1:1 blend of sodium and potassium acetate (as opposed to being added as a solid). This sample was treated in a similar manner and precipitated also in about two minutes. However, the filtration was much slower and the filtrate was cloudy.

Example 14

A 300 g sample of 10% by weight aqueous dispersion of sulfopolyester of Example 8 was placed in a 500 ml beaker and 50 g of a 40% by weight salt solution of 1:1 mixture of sodium and potassium acetate were added while stirring. After precipitation to produce a recovered sulfopolyester, the material was heated to 54° C. with stirring and then allowed to cool to room temperature. The recovered sulfopolyester was filtered using a Buchner funnel and coarse filter paper. The samples were vacuum dried for two hours at 35° C. and 24 mm Hg vacuum followed by vacuum drying one hour at 45° C. and 25 mm Hg vacuum.

The samples were analyzed for Fe, Ca, Mg, Na and K concentrations. Samples 1 and 2 were also analyzed in wet cake form prior to drying step. The percent solids of the wet cake samples after filtration were in the range of 57-62%. As expected, there was a large difference in the dried vs. wet samples. The results are noted in Table 1 below. Two washes were needed to get most metal ion levels down to substantially constant values with three washes being necessary to stabilize the calcium concentration.

TABLE 1

| Sample | ppmw Fe | ppmw Mg | ppmw Ca | Na (% by wt.) | K (% by wt) | Wash |
|--------|---------|---------|---------|---------------|-------------|------|
| 1 | 1.9 | 1.5 | 6.2 | 1.02 | 1.56 | None |
| 2 | 1.5 | 1.4 | 4.1 | 0.56 | 1.05 | 50 ml |
| 3 | 1.5 | 1.2 | 5.8 | 0.48 | 0.94 | 50 ml |
| 4 | 2.4 | 0.8 | 3.3 | 0.47 | 0.94 | 50 ml |
| 5 | 2.1 | 0.6 | 3.0 | 0.45 | 0.90 | 100 ml |
| 1W | 0.8 | 0.3 | 1.2 | 0.67 | 0.99 | — |
| 2W | 1.0 | 0.5 | 1.1 | 0.36 | 0.65 | — |

(1W and 2W represent the samples as wet cake)

These samples containing less than 20 ppm by weight of Fe, Mg and Ca ions are considered satisfactory for use in fiber melt spinning. Higher levels of divalent or higher valent metal ions can cause detrimental cross-linking of recovered sulfopolyester.

Example 15

A 231.3 g sample of fabric comprising about 30% by weight sulfopolyester polymer of Example 8 was washed for 10 minutes in 3100 g of deionized water at about 75° C. temperature to remove the sulfopolyester from the fabric producing an aqueous dispersion. The aqueous dispersion containing the sulfopolyester polymer was collected and measured to contain about 1.9% by weight sulfopolyester polymer. 1000 g of thee aqueous dispersion were boiled to evaporate about 953 g of water leaving about 47 g of sulfopolyester concentrate having about 40% by weight sulfopolyester concentration. This sulfopolyester concentrate was vacuum dried at 100° C. and 25 mm Hg vacuum for 24 hours to provide a recovered sulfopolyester polymer. This recovered sulfopolyester was successfully melt spun in to a fiber at 240° C. using 800 fpm speed and 0.06 g/min throughput and also using 3000 fpm speed and 0.2 g/min throughput using an Instron Capillary Rheometer as in Example 1.

Example 16

Another 1400 g of the aqueous dispersion of Example 15 was concentrated by passing through nanofiltration membrane of Example 5 to produce a sulfopolyester concentrate having a concentration of about 14.2%. This sulfopolyester concentrate was vacuum dried at 100° C. and 25 mm Hg vacuum for 24 hours to produce a recovered sulfopolyester that was completely dry. This dried recovered sulfopolyester was successfully melt spun in to a fiber at 240° C. using 1500 fpm speed and 0.06 g/min throughput and also using 4000 fpm speed and 0.2 g/min throughput using an Instron Capillary Rheometer as in Example 1.

Example 17

A 2000 g sample of a 30% by weight aqueous dispersion of the sulfopolyester of Example 9 was precipitated by adding 600 g of 1 mole/liter solution of potassium acetate to produce a recovered sulfopolyester. The recovered sulfopolyester was filtered using a 75 micron opening sieve. The recovered sulfopolyester was washed four times using deionized water and vacuum dried at 50° C. and 23 mm Hg vacuum for 3 days and further dried at 73° C. of 20 hours. 107.3 g of this recovered sulfopolyester was blended with 15.4 g of Staybelite Resin-E tackifier available from Eastman Chemical Company, 30.8 g of Benzoflex 9-88 plasticizer available from Velsicol Chemical Corporation and 0.46 g of Irganox 1010 available from Ciba-Geigy Chemical Corporation to make an adhesive formulation. This adhesive formulation exhibited a desirable low glass transition temperature of about 24° C.

The recovered sulfopolyester of present invention can be used in many articles. Some of these articles have been demonstrated by above mentioned examples and are not limited these examples.

That which is claimed is:

1. A process for recovering a water-dispersible sulfopolyester comprising the steps of:
   (a) providing an aqueous dispersion comprising said water-dispersible sulfopolyester, wherein said water-dispersible sulfopolyester comprises:
       (i) residues of one or more dicarboxylic acids,
       (ii) about 2 to about 20 mole %, based on the total moles of diacid or diol residues, of residues of at least one sulfomonomer having 2 functional groups and one or more sulfonate groups attached to an aromatic or cycloaliphatic ring, wherein said functional groups are hydroxyl, carboxyl, or a combination thereof,
       (iii) one or more diol residues, wherein at least 25 mole %, based on the total diol residues, is a poly(ethylene glycol) having a structure

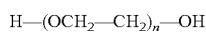

wherein n is an integer in the range of 2 to about 500, and
       (iv) 0 to about 25 mole %, based on the total repeating units, of residues of a branching monomer having 3 or more functional groups, wherein said functional groups are hydroxyl, carboxyl, or a combination thereof;
   (b) removing water from said aqueous dispersion thereby forming a sulfopolyester concentrate having a sulfopolyester concentration at least twice that of said aqueous dispersion, wherein said aqueous dispersion comprises less than about 10 weight % of said water-dispersible sulfopolyester, wherein said sulfopolyester concentrate has a sulfopolyester concentration of greater than about 20 weight percent; and
   (c) recovering at least a portion of said sulfopolyester from said sulfopolyester concentrate to produce a recovered sulfopolyester. wherein said recovered sulfopolyester exhibits an average molecular weight of at least about 50% of the molecular weight of said sulfopolyester present in said aqueous dispersion.

2. A process according to claim 1 wherein said sulfopolyester has a glass transition temperature (Tg) of at least 25° C.

3. A process according to claim 2 wherein said sulfopolyester comprises:
   (i) residues of one or more dicarboxylic acids,
   (ii) about 4 to about 40 mole %, based on the total repeating units, of residues of at least one sulfomonomer having 2 functional groups and one or more metal sulfonate groups attached to an aromatic or cycloaliphatic ring wherein the functional groups are hydroxyl, carboxyl, or a combination thereof;
   (iii) one or more diol residues, wherein at least 20 mole %, based on the total diol residues, is a poly(ethylene glycol) having a structure

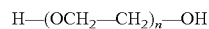

wherein n is an integer in the range of 2 to about 500;
   (iv) 0 to about 25 mole %, based on the total repeating units, of residues of a branching monomer having 3 or more functional groups wherein the functional groups are hydroxyl, carboxyl, or a combination thereof.

4. A process according to claim 1 wherein step (b) comprises passing said aqueous dispersion through a nanofiltration element.

5. A process according to claim 4 wherein said nanofiltration element comprises a porous nanofiltration membrane.

6. A process according to claim 5 wherein said nanofiltration membrane having pore sizes of less than about 25 nm.

7. A process according to claim 1 wherein step (b) comprises forming a sulfopolyester concentrate having a sulfopolyester concentration at least five times that of said aqueous dispersion.

8. A process according to claim 1 wherein step (c) comprises evaporating water from said sulfopolyester concentrate.

9. A process according to claim 1 wherein step (c) comprises precipitating at least a portion of said sulfopolyester in said sulfopolyester concentrate to produce said recovered sulfopolyester.

10. A process according to claim 1 wherein step (c) further comprises washing said recovered sulfopolyester to remove salt.

11. A process according to claim 10 wherein step (c) further comprising drying said recovered sulfopolyester.

12. A process according to claim 9 wherein said sulfopolyester is precipitated by adding a quantity of a monovalent metal salt to said sulfopolyester concentrate.

13. A process according to claim 12 wherein said monovalent metal salt is selected from the group consisting of potassium salts, sodium salts, lithium salts and mixtures thereof.

14. A process according to claim 13 wherein said salt is selected from the group consisting of potassium acetate, sodium sulfate, and mixtures thereof.

15. A process according to claim 9 wherein said sulfopolyester is precipitated by non-solvent precipitation.

16. A process according to claim 15 wherein said non-solvent comprises isopropanol.

17. A process according to claim 1 further comprising:
   (d) reusing said recovered sulfopolyester in the manufacture of an article.

18. A process according to claim 17 wherein said article comprises at least one member selected from the group consisting of fibers, multicomponent fibers, nonwoven fabric films, adhesives and clothing.

19. A process according to claim 1 wherein said aqueous dispersion is formed by washing a product comprising said sulfopolyester thereby disassociating at least a portion of said sulfopolyester from said product.

20. A process for recovering a water-dispersible sulfopolyester comprising the steps of:
(a) washing an article in an aqueous medium, wherein said article comprises said water-dispersible sulfopolyester, wherein said water-dispersible sulfopolyester comprises:
  (i) residues of one or more dicarboxylic acids,
  (ii) about 2 to about 20 mole %, based on the total moles of diacid or diol residues, of residues of at least one sulfomonomer having 2 functional groups and one or more sulfonate groups attached to an aromatic or cycloalirhatic ring, wherein said functional groups are hydroxyl, carboxyl, or a combination thereof,
  (iii) one or more diol residues, wherein at least 25 mole %, based on the total diol residues, is a poly(ethylene glycol) having a structure

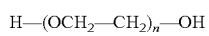

wherein n is an integer in the range of 2 to about 500, and
  (iv) 0 to about 25 mole %, based on the total repeating units, of residues of a branching monomer having 3 or more functional groups, wherein said functional groups are hydroxyl, carboxyl, or a combination thereof,
wherein said washing disassociates at least a portion of said water-dispersible sulfopolyester from said article thereby forming an aqueous dispersion comprising said sulfopolyester;
(b) passing said dispersion through a nanofiltration element thereby forming a sulfopolyester concentrate having a sulfopolyester concentration that is at least twice that of said dispersion; and
(c) recovering at least a portion of said sulfopolyester from said sulfopolyester concentrate to produce recovered sulfopolyester, wherein said recovered sulfopolyester exhibits an average molecular weight of at least about 50% of the molecular weight of said sulfopolyester present in said aqueous dispersion.

21. A process according to claim 20 wherein said aqueous dispersion comprises less than about 10 weight % of said sulfopolyester.

22. A process according to claim 20 wherein said nanofiltration element comprises a porous nanofiltration membrane.

23. A process according to claim 22 wherein said nanofiltration element comprises a porous nanofiltration membrane having an average pore size of less than about 25 nm.

24. A process according to claim 20 wherein said sulfopolyester concentrate has a sulfopolyester concentration of greater than about 10 weight %.

25. A process according to claim 20 wherein step (c) comprises evaporating water from said sulfopolyester concentrate.

26. A process according to claim 20 wherein step (c) comprises precipitating at least a portion of said sulfopolyester in said sulfopolyester concentrate.

27. A process according to claim 26 wherein said sulfopolyester is precipitated by adding a quantity of a monovalent metal salt to said sulfopolyester concentrate.

28. A process according to claim 26 wherein said sulfopolyester is precipitated by non-solvent precipitation.

29. A process according to claim 20 further comprising:
(d) reusing said recovered sulfopolyester in the manufacture of an article.

30. A process according to claim 29 wherein said article comprises at least one member selected from the group consisting of non-woven fabric, multicomponent fibers, films, adhesives and clothing.

31. A process for recovering a water-dispersible sulfopolyester comprising the steps of:
(a) washing an article comprising said sulfopolyester thereby disassociating at least a portion of said sulfopolyester from said article and forming an aqueous dispersion comprising said disassociated sulfopolyester, wherein said water-dispersible sulfopolyester comprises:
  (i) residues of one or more dicarboxylic acids.
  (ii) about 2 to about 20 mole %, based on the total moles of diacid or diol residues, of residues of at least one sulfomonomer having 2 functional groups and one or more sulfonate groups attached to an aromatic or cycloalirhatic ring, wherein said functional groups are hydroxyl, carboxyl, or a combination thereof,
  (iii) one or more diol residues, wherein at least 25 mole %, based on the total diol residues, is a poly(ethylene glycol) having a structure

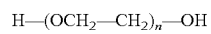

wherein n is an integer in the range of 2 to about 500, and
  (iv) 0 to about 25 mole %, based on the total repeating units, of residues of a branching monomer having 3 or more functional groups, wherein said functional groups are hydroxyl, carboxyl, or a combination thereof;
(b) removing water from said aqueous dispersion to form a sulfopolyester concentrate having a sulfopolyester concentration that is greater than said aqueous dispersion, wherein water is removed from said aqueous dispersion by nanofiltration and/or by evaporation; and
(c) recovering at least a portion of said sulfopolyester from said sulfopolyester concentrate to produce a recovered sulfopolyester, wherein said recovered sulfopolyester exhibits an average molecular weight of at least about 50% of the molecular weight of said sulfopolyester present in said aqueous disrersion.

32. A process according to claim 31 wherein said aqueous dispersion comprises less than about 10 weight % of said sulfopolyester.

33. A process according to claim 31 wherein step (b) comprises passing said aqueous dispersion through a nanofiltration element.

34. A process according to claim 33 wherein said nanofiltration element comprises a porous nanofiltration membrane having an average pore size of less than about 25 nm.

35. A process according to claim 31 wherein step (b) comprises forming a sulfopolyester concentrate having a sulfopolyester concentration at least twice that of said aqueous dispersion.

36. A process according to claim 31 wherein said sulfopolyester concentrate has a sulfopolyester concentration of greater than about 10 weight %.

37. A process according to claim 31 wherein step (c) comprises evaporating water from said sulfopolyester concentrate.

38. A process according to claim 31 wherein step (c) comprises precipitating at least a portion of said sulfopolyester in said sulfopolyester concentrate.

39. A process according to claim 38 wherein said sulfopolyester is precipitated by adding a quantity of a monovalent metal salt to said sulfopolyester concentrate.

40. A process according to claim 31 further comprising reusing said recovered sulfopolyester in the manufacture of an article.

41. A process for forming a concentrated sulfopolyester dispersion comprising the steps of:
(a) washing an article in an aqueous medium, wherein said article comprises said water-dispersible sulfopolyester, wherein said water-dispersible sulfopolyester comprises:
(i) residues of one or more dicarboxylic acids,
(ii) about 2 to about 20 mole %, based on the total moles of diacid or diol residues, of residues of at least one sulfomonomer having 2 functional groups and one or more sulfonate groups attached to an aromatic or cycloalirhatic ring, wherein said functional groups are hydroxyl, carboxyl, or a combination thereof,
(iii) one or more diol residues, wherein at least 25 mole %, based on the total diol residues, is a roly(ethylene glycol) having a structure

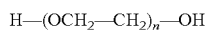

H—(OCH$_2$—CH$_2$)$_n$—OH wherein n is an integer in the range of 2 to about 500, and
(iv) 0 to about 25 mole %, based on the total repeating units, of residues of a branching monomer having 3 or more functional groups, wherein said functional groups are hydroxyl, carboxyl, or a combination thereof,
wherein said washing disassociates at least a portion of said water-dispersible sulfopolyester from said article thereby forming an aqueous dispersion comprising a sulfopolyester; and
(b) removing water from said dispersion to form a sulfopolyester concentrate having a sulfopolyester concentration that is at least twice that of said dispersion, wherein said aqueous dispersion comprises less than about 10 weight % of said water-dispersible sulfopolyester, wherein said sulfopolyester concentrate has a sulfopolyester concentration of greater than about 20 weight percent.

42. A process according to claim 41 wherein step (b) comprises passing said aqueous dispersion through a nanofiltration element comprising a porous nanofiltration membrane.

43. A process according to claim 41 further comprising reusing of said sulfopolyester concentrate in manufacture of articles.

44. A concentrated aqueous dispersion comprising at least about 10 weight % of a sulfopolyester recovered from an article, wherein said sulfopolyester comprises:
(i) residues of one or more dicarboxylic acids.
(ii) about 2 to about 20 mole %, based on the total moles of diacid or diol residues, of residues of at least one sulfomonomer having 2 functional groups and one or more sulfonate groups attached to an aromatic or cycloalirhatic ring, wherein said functional groups are hydroxyl, carboxyl, or a combination thereof,
(iii) one or more diol residues, wherein at least 25 mole %, based on the total diol residues, is a poly(ethylene glycol) having a structure

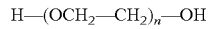

H—(OCH$_2$—CH$_2$)$_n$—OH wherein n is an integer in the range of 2 to about 500, and
(iv) 0 to about 25 mole %, based on the total repeating units, of residues of a branching monomer having 3 or more functional groups, wherein said functional groups are hydroxyl, carboxyl, or a combination thereof.

45. A concentrated aqueous dispersion according to claim 44 wherein said sulfopolyester presents an average particle size of about 50 to about 500 nm.

46. A concentrated aqueous dispersion according to claim 44 wherein said aqueous dispersion comprises at least about 20 weight % of said sulfopolyester.

47. A concentrated aqueous dispersion according to claim 44 wherein said sulfopolyester has a glass transition temperature (Tg) of at least 25° C.

48. A concentrated aqueous dispersion according to claim 44 wherein said sulfopolyester has a glass transition temperature (Tg) of at least 25° C. and comprises:
(i) residues of one or more dicarboxylic acids;
(ii) about 4 to about 40 mole %, based on the total repeating units, of residues of at least one sulfomonomer having 2 functional groups and one or more metal sulfonate groups attached to an aromatic or cycloaliphatic ring wherein the functional groups are hydroxyl, carboxyl, or a combination thereof;
(iii) one or more diol residues wherein at least 20 mole %, based on the total diol residues, is a poly(ethylene glycol) having a structure

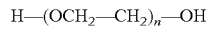

H—(OCH$_2$—CH$_2$)$_n$—OH wherein n is an integer in the range of 2 to about 500;
(iv) 0 to about 25 mole %, based on the total repeating units, of residues of a branching monomer having 3 or more functional groups wherein the functional groups are hydroxyl, carboxyl, or a combination thereof.

* * * * *